S. G. NEAL.
AIR RETAINING VALVE FOR AIR BRAKE APPARATUS.
APPLICATION FILED JUNE 10, 1915.
1,157,954.
Patented Oct. 26, 1915.
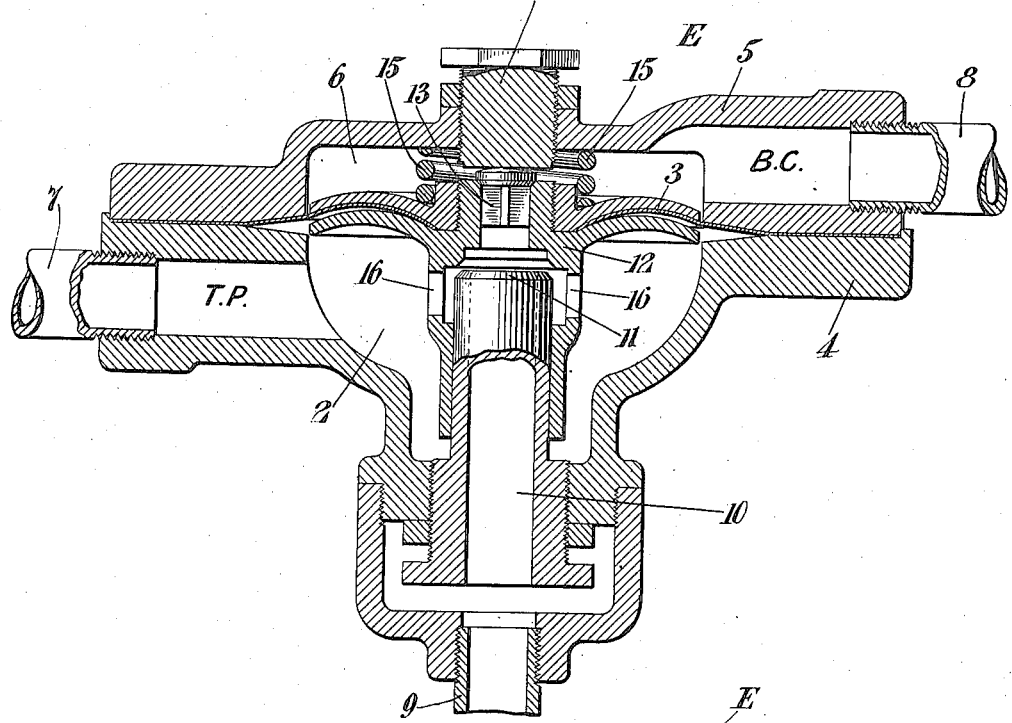
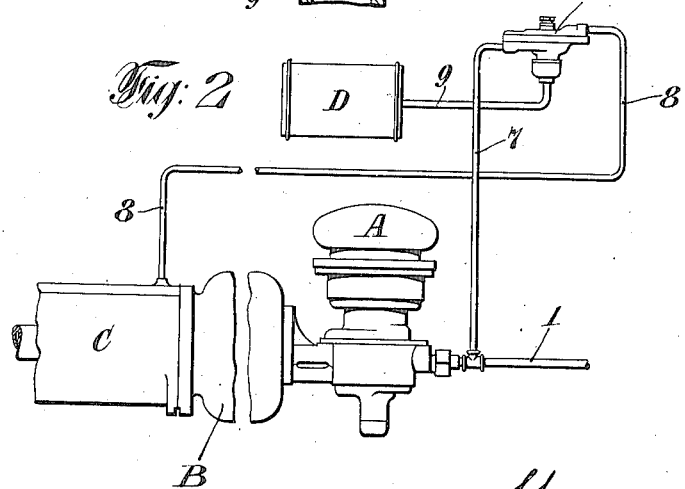
Inventor
Spencer G. Neal
By his Attorneys
Davis Davis

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF LOS ANGELES, CALIFORNIA, A CORPORATION OF CALIFORNIA.

AIR-RETAINING VALVE FOR AIR-BRAKE APPARATUS.

1,157,954.

Specification of Letters Patent.

Patented Oct. 26, 1915.

Application filed June 10, 1915. Serial No. 33,232.

*To all whom it may concern:*

Be it known that I, SPENCER G. NEAL, a citizen of the United States, and resident of the city of Los Angeles, county of Los Angeles, and State of California, have invented certain new and useful Improvements in Air-Retaining Valves for Air-Brake Apparatus, of which the following is a specification.

This invention relates to certain improvements in air brake apparatus shown in my Patent No. 1,082,758, patented December 30, 1913. In that patent I have shown a reservoir for augmenting the train pipe capacity, one of said reservoirs being located adjacent to and connected with each braking unit. The purpose of thus increasing the train pipe capacity, as fully set out in my aforesaid patent, is to permit train pipe air to be used for ordinary service applications of the brakes without materially reducing train pipe pressure, the advantage of which is clearly pointed out in my said patent. In an air braking apparatus such as shown in my aforesaid patent, train pipe air is used for service applications until the train pipe and brake cylinder pressures have equalized, at which time the triple valve is operated to introduce auxiliary reservoir air into the brake cylinder for emergency applications or service emergency applications, as fully set forth in my aforesaid patent.

In my Patent No. 1,125,151, I have shown a valve to control communication between the augmenting reservoir and the train pipe which valve will be controlled by the brake cylinder pressure, whereby when the said pressure exceeds the train pipe pressure communication between the train pipe and the augmenting reservoir will be closed. This was to prevent the depletion of the augmenting reservoir after the train pipe and brake cylinder pressure had equalized and auxiliary reservoir pressure had been admitted to the brake cylinder.

In the present invention the service reservoir is in communication with the train pipe during all service applications, but means are provided whereby when the brake cylinder pressure is equal to or above train pipe pressure or when after an equalization between train pipe and brake cylinder pressures the brake cylinder pressure leaks down below train pipe pressure and augmenting reservoir pressure, the augmenting reservoir will be sealed against communication with the train pipe and will be placed in communication with the brake cylinder so that the said reservoir capacity will be added to the brake cylinder capacity and disconnected from the train pipe.

In the drawing Figure 1 is a vertical sectional view of the retaining valve; and Fig. 2 a diagrammatic view of a portion of an air brake apparatus with the retaining valve applied thereto.

Referring to the various parts by reference characters, A designates a triple valve, B an auxiliary reservoir; C a brake cylinder, D a service or augmenting reservoir, and E the retaining valve. These parts are diagrammatically arranged and connected in Fig. 2.

The service or augmenting reservoir D is connected to the train pipe and to the brake cylinder through the controlling or retaining valve E. This retaining valve during all service applications of the brakes, operates as described in my Patent No. 1,125,151, dated January 19, 1915, and consists of an outer main casing forming a large chamber 2 which is closed at its upper end by a flexible diaphragm 3, the margin of said diaphragm being clamped between an annular flange 4 on the upper end of the casing, and a cap 5. This cap 5 forms a chamber 6 above the diaphragm 3. The main chamber 2 is in communication with the train pipe through a pipe 7. The chamber 6 is in communication with the brake cylinder through pipe 8. The augmenting reservoir D is connected to the lower end of the valve casing by means of a pipe 9.

Extending upwardly through the bottom of the valve casing and into the chamber 2 is an open-ended tubular post 10 having a seat 11 formed at its upper end. Sliding on this post is a tubular valve 12 which is adapted to seat on the upper end of the post 10. This tubular valve is carried by the diaphragm 3 and is adapted to be seated and unseated from the valve seat 11 by variations in pressure in chambers 2 and 6. In the center of the diaphragm is a passage adapted to be closed by a downwardly seating valve 13, said passage communicating with the interior of the tubular valve directly above the upper open end of the post 10. Bearing on the diaphragm 3 and against the upper wall of the cap 5 is a spring 15 which normally tends to depress the diaphragm and will seat valve 12 on valve seat 11 whenever there is an equalization of pressures in the chambers 2 and 6. Threaded through the cap 5 is an adjustable stop 14. By varying the position of this stop the extent of movement of the diaphragm may be varied.

With train pipe pressure exceeding brake cylinder pressure diaphragm 3 will be maintained in its upper position and valve 13 will be held closed. This places the augmenting reservoir in communication with the train pipe through post 10, valve 12 and orifices 16 in the side walls of said valve. When, however, there has been an equalization of pressures in the brake cylinder and train pipe the spring 15 will force downwardly the diaphragm and with it will go the valve 13. This operation will seal the augmenting reservoir from the train pipe and, therefore, air from the said reservoir cannot flow to the train pipe. When the brake cylinder pressure leaks down below the pressure in the augmenting reservoir, which, as heretofore noted, was sealed at an equalization of pressures in train pipe and brake cylinder, the augmenting reservoir pressure will force open valve 13 and flow to the brake cylinder through pipe 8. It will, therefore, be seen that the augmenting reservoir will be connected to the train pipe for ordinary service applications, and will be connected to the brake cylinder immediately upon the brake cylinder pressure dropping below the augmenting reservoir pressure. This adds a large volume of air to the brake cylinder capacity so that a small leakage therefrom will not materially affect the pressure in said cylinder.

The retaining valve acts in the nature of a pneumatic switch to disconnect the augmenting reservoir from the train pipe after an equalization of train pipe and brake cylinder pressures, and to connect it to the brake cylinder when the brake cylinder pressure leaks down below the pressure in the augmenting reservoir.

What I claim is:

1. An air brake apparatus comprising a triple valve, a train pipe, a brake cylinder, a train pipe augmenting reservoir, a retaining valve connecting said reservoir to the train pipe and to the brake cylinder, means in said retaining valve to seal the augmenting reservoir when the train pipe and brake cylinder pressures are equalized, and means operating to connect the said augmenting reservoir to the brake cylinder when the brake cylinder pressure is reduced below the augmenting reservoir pressure and the train pipe pressure is below brake cylinder pressure.

2. An air brake apparatus comprising a triple valve, a brake cylinder, a train pipe, an augmenting reservoir, a retaining valve connecting said reservoir to the train pipe and to the brake cylinder, and consisting of a casing, a movable diaphragm or abutment therein forming two chambers, means connecting the chamber above said diaphragm to the brake cylinder, means connecting the chamber below said diaphragm to the train pipe, means forming a central chamber within said casing, means connecting said central chamber to the augmenting reservoir, a valve carried by the diaphragm and adapted to be opened by a superior pressure from the augmenting reservoir, a valve carried by said diaphragm and adapted to seal the augmenting reservoir from the train pipe upon an equalization of train pipe and brake cylinder pressures whereby when the brake cylinder pressure is reduced below augmenting reservoir pressure after an equalization of train pipe and brake cylinder pressures and the train pipe pressure is below brake cylinder pressure, said augmenting reservoir will be connected to the brake cylinder.

3. An air brake apparatus comprising a triple valve, a brake cylinder, a train pipe, an augmenting reservoir, means connecting the augmenting reservoir to the train pipe and to the brake cylinder, said means being operated by variations in pressure to seal the augmenting reservoir from the train pipe and to place it in communication with the brake cylinder.

4. A retaining valve for an air brake apparatus comprising a casing, a diaphragm within said casing and dividing it into two chambers, means adapted to connect one of said chambers to a brake cylinder, means adapted to connect the other chamber to a train pipe, means adapted to connect this latter chamber with a train pipe augmenting reservoir, means carried by the diaphragm to control communication between the train pipe and the augmenting reservoir, and means for opening communication between the augmenting reservoir and the brake cylinder when the brake cylinder pressure is below the pressure in the augmenting reservoir and the train pipe pressure is below brake cylinder pressure.

5. A retaining valve for an air brake apparatus comprising a casing, a diaphragm within said casing and dividing it into two chambers, means adapted to connect one of said chambers to a brake cylinder, means adapted to connect the other chamber to a train pipe, means adapted to connect this latter chamber with a train pipe augmenting reservoir, means carried by the diaphragm to control communication between the train pipe and the augmenting reservoir, and a valve opened by augmenting reservoir pressure and opening communication between the augmenting reservoir and the brake cylinder when the brake cylinder pressure is below the pressure in the augmenting reservoir and the train pipe pressure is below brake cylinder pressure.

6. A retaining valve for an air brake apparatus comprising a casing, a diaphragm within said casing and dividing it into two chambers, means adapted to connect one of said chambers to a brake cylinder, means adapted to connect the other chamber to a train pipe, means adapted to connect this latter chamber with a train pipe augmenting reservoir, means carried by the diaphragm to control communication between the train pipe and the augmenting reservoir, and a valve carried by the diaphragm adapted to be opened by augmenting reservoir pressure and opening communcation between the augmenting reservoir and the brake cylinder when the brake cylinder pressure is below the pressure in the augmenting reservoir and the train pipe pressure is below brake cylinder pressure.

7. An air brake apparatus comprising a triple valve, a train pipe, a brake cylinder, a train pipe augmenting reservoir, a retaining valve connecting said reservoir to the train pipe and to the brake cylinder, means in said retaining valve to seal the augmenting reservoir when the train pipe and brake cylinder pressures are equalized, and means operating to connect the said augmenting reservoir to the brake cylinder when the brake cylinder pressure is reduced below the augmenting reservoir pressure and the train pipe pressure is below brake cylinder pressure.

8. An air brake apparatus comprising a train pipe, a brake cylinder, a train pipe augmenting reservoir, and a valve connecting the said reservoir to the train pipe and brake cylinder said valve including means for connecting the augmenting reservoir to the brake cylinder upon a reduction of train pipe pressure below brake cylinder pressure.

9. An air brake apparatus comprising a train pipe, a brake cylinder, a triple valve, a train pipe augmenting reservoir, and means to connect the augmenting reservoir to the brake cylinder when the train pipe pressure is below brake cylinder pressure.

10. An air brake apparatus comprising a train pipe, a brake cylinder, a triple valve, a train pipe augmenting reservoir normally in communication with the train pipe, and means operating to place said reservoir in communication with the brake cylinder and seal it from the train pipe when the train pipe pressure is reduced below brake cylinder pressure and brake cylinder pressure is below augmenting reservoir pressure.

11. An air brake apparatus comprising a train pipe, a brake cylinder, a train pipe augmenting reservoir, and a valve connecting the said reservoir to the train pipe and brake cylinder said valve including means for connecting the augmenting reservoir to the brake cylinder when the train pipe pressure does not exceed brake cylinder pressure.

12. An air brake apparatus comprising a train pipe, a brake cylinder, a triple valve, a train pipe augmenting reservoir, and means to connect the augmenting reservoir to the brake cylinder when the train pipe pressure does not exceed brake cylinder pressure.

13. An air brake apparatus comprising a train pipe, a brake cylinder, a triple valve, a train pipe augmenting reservoir normally in communication with the train pipe, and means operating to place said reservoir in communication with the brake cylinder and seal it from the train pipe when the train pipe pressure does not exceed brake cylinder pressure, whereby the brake cylinder pressure and the augmenting reservoir will remain equalized.

14. An air brake apparatus comprising a train pipe, a brake cylinder, a triple valve, a train pipe augmenting reservoir normally in communication with the train pipe, and means operated by variations in train pipe pressure to place said reservoir in communication with the brake cylinder and seal it from the train pipe.

15. An air brake apparatus comprising a train pipe, a brake cylinder, a triple valve, a train pipe augmenting reservoir normally in communication with the train pipe, and means operated by variations in pressure to place said reservoir in communcation with the brake cylinder and seal it from the train pipe.

In testimony whereof I hereunto affix my signature.

SPENCER G. NEAL.